(12) United States Patent
Sefcik

(10) Patent No.: US 7,277,558 B2
(45) Date of Patent: Oct. 2, 2007

(54) METHOD AND SYSTEM FOR ESTIMATING THE POSITION OF MOVING OBJECTS IN IMAGES

(75) Inventor: Jason Sefcik, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 613 days.

(21) Appl. No.: 09/993,735

(22) Filed: Nov. 27, 2001

(65) Prior Publication Data

US 2003/0099375 A1 May 29, 2003

(51) Int. Cl.
*G06K 9/00* (2006.01)

(52) U.S. Cl. ............... 382/103; 382/106; 382/107; 348/169

(58) Field of Classification Search ............ 382/103, 382/106, 107; 348/169–172, 154, 155
See application file for complete search history.

(56) References Cited

U.S. PATENT DOCUMENTS

| | | | | |
|---|---|---|---|---|
| 3,414,216 A | * | 12/1968 | Nash .................... 244/3.21 |
| 4,148,029 A | | 4/1979 | Quesinberry |
| 4,312,262 A | * | 1/1982 | Tye ..................... 89/41.21 |
| 4,320,287 A | * | 3/1982 | Rawicz ................. 235/412 |
| 4,405,940 A | * | 9/1983 | Woolfson et al. ......... 348/170 |
| 4,449,127 A | | 5/1984 | Sanchez |
| 4,474,343 A | * | 10/1984 | Zwirn et al. ............ 244/3.11 |
| 4,589,610 A | * | 5/1986 | Schmidt ................ 244/3.19 |
| 4,739,401 A | * | 4/1988 | Sacks et al. ............ 382/103 |
| 4,959,800 A | * | 9/1990 | Woolley ................ 235/411 |
| 5,051,751 A | | 9/1991 | Gray |
| 5,062,056 A | * | 10/1991 | Lo et al. ................ 235/411 |
| 5,164,910 A | * | 11/1992 | Lawson et al. ........... 235/411 |
| 5,196,688 A | * | 3/1993 | Hesse et al. ............ 250/203.6 |
| 5,210,798 A | | 5/1993 | Ekchian et al. |
| 5,214,433 A | * | 5/1993 | Alouani et al. ........... 342/95 |
| 5,285,273 A | | 2/1994 | James et al. |
| 5,303,878 A | * | 4/1994 | McWilliams et al. ....... 244/3.15 |
| 5,325,098 A | * | 6/1994 | Blair et al. ............. 342/95 |
| 5,341,142 A | * | 8/1994 | Reis et al. .............. 342/64 |
| 5,374,932 A | * | 12/1994 | Wyschogrod et al. ....... 342/36 |
| 5,400,264 A | * | 3/1995 | Phillis et al. ............ 700/90 |
| 5,410,143 A | | 4/1995 | Jones |

(Continued)

OTHER PUBLICATIONS

Browne, Michael E., Schaum's Outline of Theory and Problems of Physics for Engineering and Science, 1999, McGraw-Hill, ISBN 0-07-008498-X, p. 41.*

*Primary Examiner*—Matthew C. Bella
*Assistant Examiner*—Sath V. Perungavoor
(74) *Attorney, Agent, or Firm*—Buchanan Ingersoll & Rooney PC

(57) ABSTRACT

A method and system are disclosed for estimating a position of moving objects in a set of image data. In accordance with exemplary embodiments of the present invention, a position of an object is identified in a first frame of image data acquired at a first time. The object is determined to be undetected in a second frame of image data acquired at a second time. Movement of the object is estimated to determine its estimated position in the second frame of image data using at least one of velocity and acceleration of the object and time between frames of image data. The estimated position is used to determine a position of the object in a third frame of image data acquired at a third time.

33 Claims, 4 Drawing Sheets

U.S. PATENT DOCUMENTS

Figure 1A:
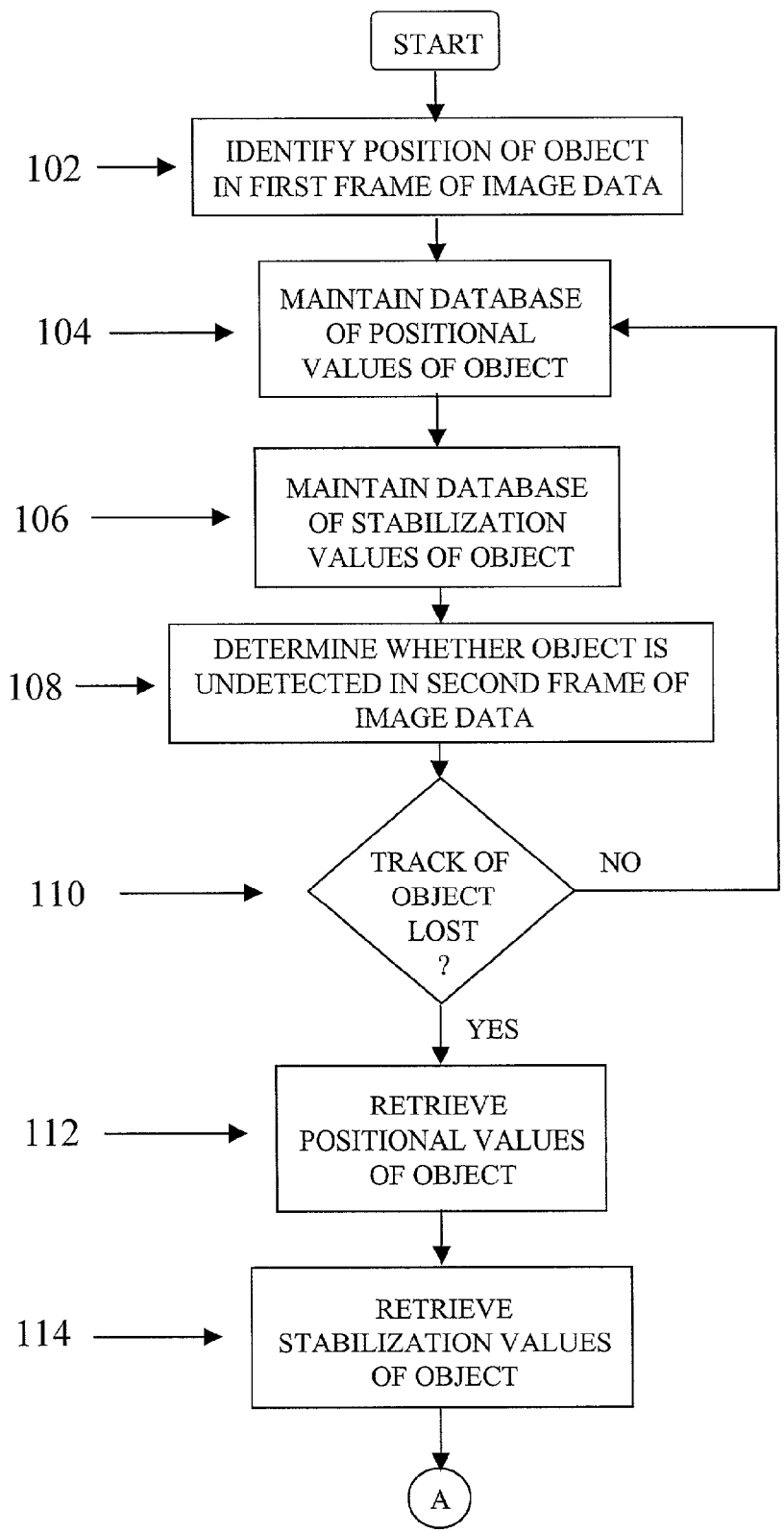

| | | |
|---|---|---|
| 5,422,829 A | 6/1995 | Pollock |
| 5,422,830 A * | 6/1995 | Post .......................... 348/169 |
| 5,455,587 A * | 10/1995 | Schneider .................... 342/62 |
| 5,488,675 A * | 1/1996 | Hanna ........................ 382/284 |
| 5,557,685 A | 9/1996 | Schlossers et al. |
| 5,581,629 A | 12/1996 | Hanna et al. |
| 5,631,653 A | 5/1997 | Reedy |
| 5,684,887 A * | 11/1997 | Lee et al. ................... 382/107 |
| 5,784,026 A * | 7/1998 | Smith et al. ................ 342/160 |
| 5,805,742 A * | 9/1998 | Whitsitt ...................... 382/275 |
| 5,835,641 A * | 11/1998 | Sotoda et al. ............... 382/291 |
| 5,867,584 A | 2/1999 | Hu et al. |
| 5,886,744 A * | 3/1999 | Hannah ................. 375/240.16 |
| 5,909,190 A * | 6/1999 | Lo et al. ..................... 342/159 |
| 5,937,078 A | 8/1999 | Hyland et al. |
| 5,960,097 A * | 9/1999 | Pfeiffer et al. .............. 382/103 |
| 6,005,610 A | 12/1999 | Pingali |
| 6,169,574 B1 * | 1/2001 | Noguchi et al. ....... 348/208.16 |
| 6,179,246 B1 * | 1/2001 | Fisel et al. ................. 244/3.16 |
| 6,262,680 B1 * | 7/2001 | Muto .......................... 342/74 |
| 6,493,625 B2 * | 12/2002 | Andreas et al. ............... 701/96 |
| 6,545,436 B1 * | 4/2003 | Gary .......................... 315/507 |
| 6,628,711 B1 * | 9/2003 | Mathew et al. ........ 375/240.12 |

\* cited by examiner

METHOD AND SYSTEM FOR ESTIMATING THE POSITION OF MOVING OBJECTS IN IMAGES

BACKGROUND

1. Field of the Invention

The present invention relates to the tracking of objects in image data. More particularly, the present invention relates to a method and system for estimating the position of moving objects in a set of image data.

2. Background Information

Target Tracking is an essential requirement for surveillance systems employing one or more sensors, together with computer subsystems, to interpret an environment. The objective of target tracking is to collect sensor data from a field of view (FOV) containing one or more potential targets of interest and to then partition the sensor data into sets of observations, or tracks, that are produced by the same sources. Once tracks are formed and confirmed (so that background and other false targets are reduced), the number of targets can be estimated and quantities, such as target velocity, future predicted position, and target classification characteristics, can be computed for each track.

A target tracker can lose track of a target for many different reasons. For example, missiles plumes, blurring of the image, the target going behind objects such as trees or buildings, and aspect changes are just a few of the possible reasons which can cause a target tracker to lose track of the target. Whatever the reason, however, the results are the same. In most circumstances when the target tracker indicates that there is insufficient information to track the target, a loss of track occurs, which forces that operator to reacquire the target. Thus, operators must spend time to reacquire the target track instead of being allowed to accomplish other tasks.

It would be desirable to provide a simple method that can be used by any target tracker for automatically tracking objects that may become occluded for a period of time by any type of occlusion.

SUMMARY OF THE INVENTION

A method and system are disclosed for estimating a position of moving objects in a set of image data. In accordance with exemplary embodiments of the present invention, a position of an object is identified in a first frame of image data acquired at a first time. The object is determined to be undetected in a second frame of image data acquired at a second time. Movement of the object is estimated to determine its estimated position in the second frame of image data using at least one of velocity and acceleration of the object and time between frames of image data. The estimated position is used to determine a position of the object in a third frame of image data acquired at a third time.

BRIEF DESCRIPTION OF THE DRAWING FIGURES

Figure 1B:
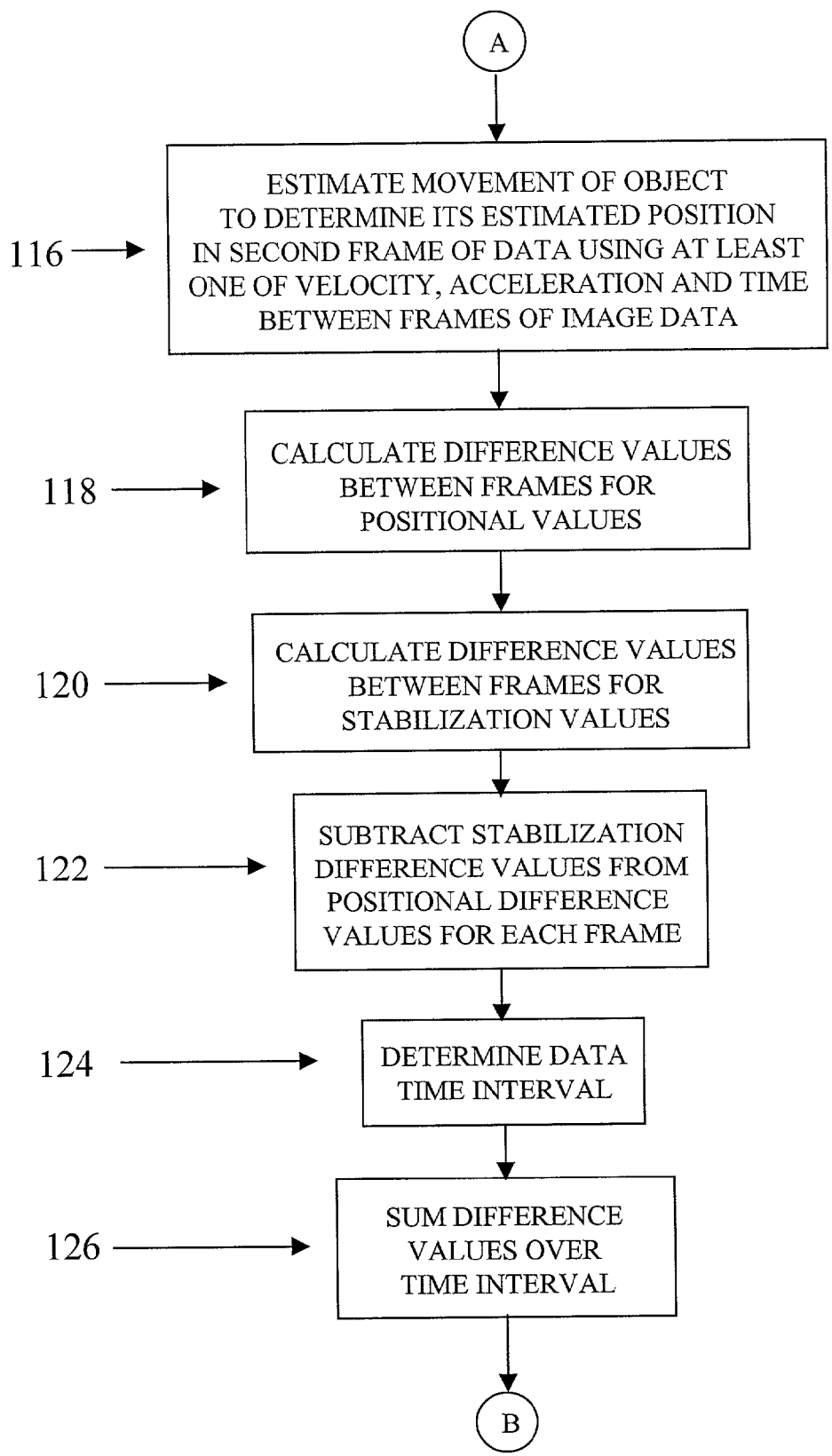
Figure 1C:
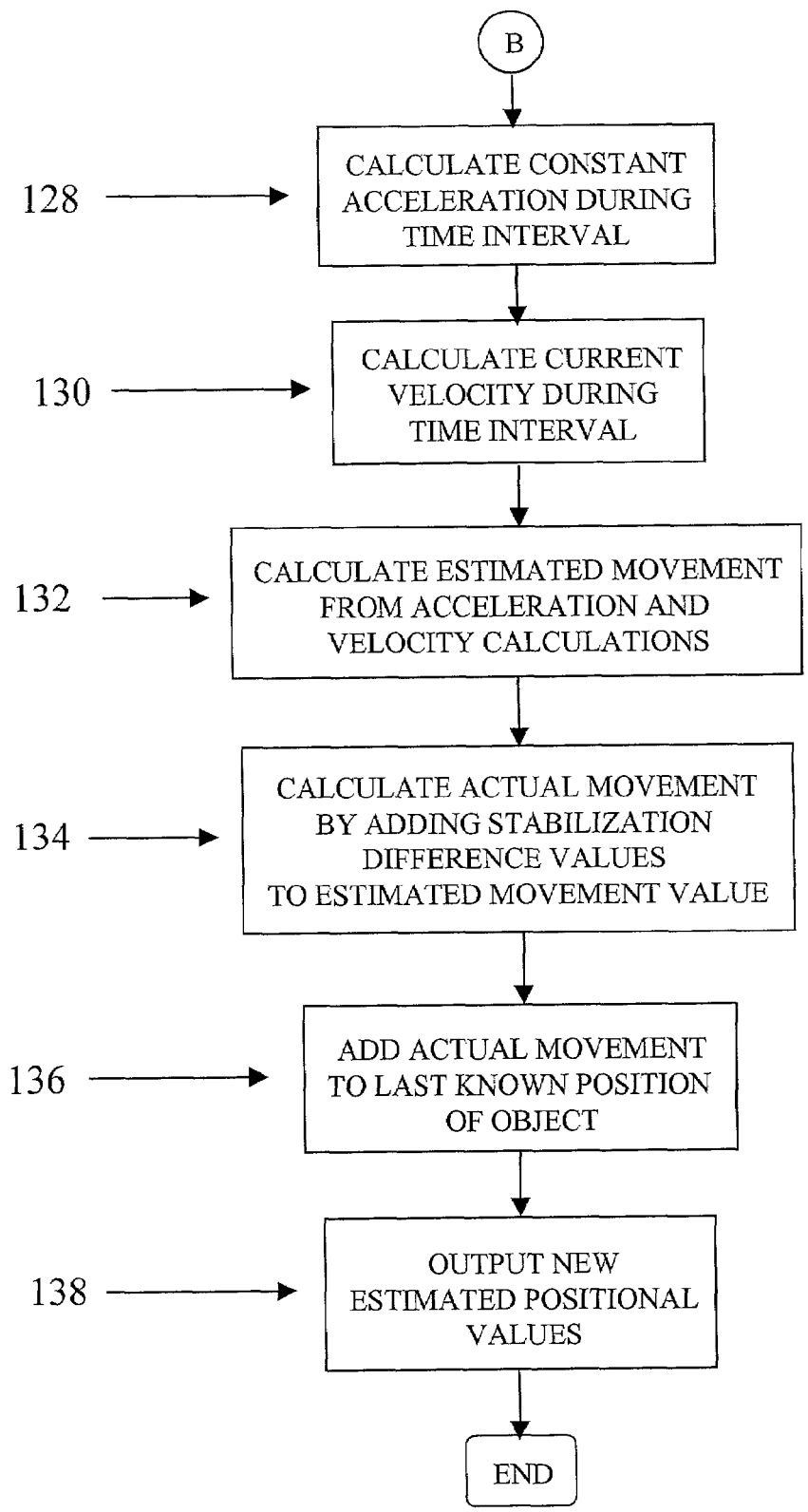
Figure 2:
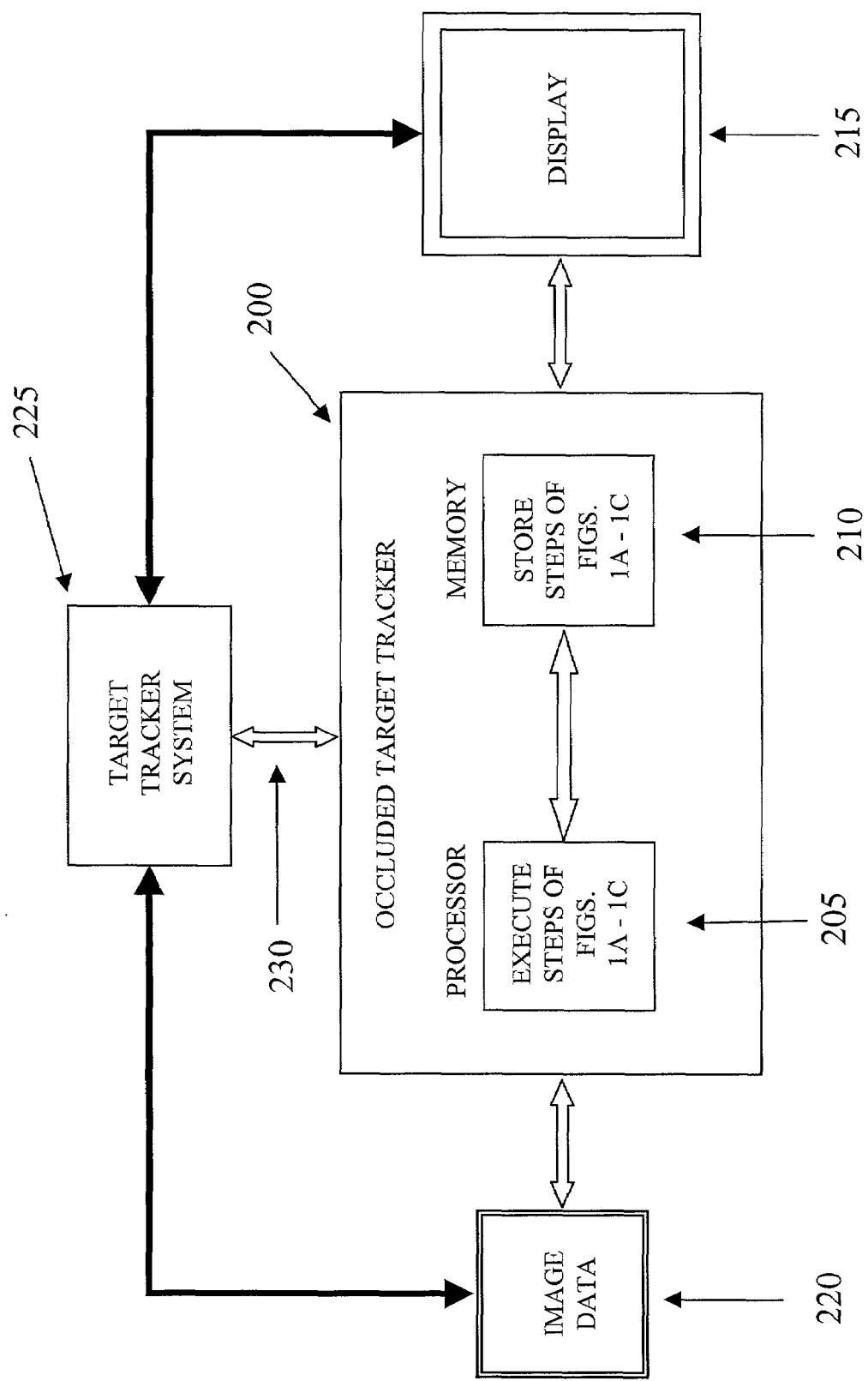

Other objects and advantages of the present invention will become apparent to those skilled in the art upon reading the following detailed description of preferred embodiments, in conjunction with the accompanying drawings, wherein like reference numerals have been used to designate like elements, and wherein:

FIGS. 1A, 1B and 1C are flowcharts illustrating the steps carried out for estimating a position of moving objects in a set of image data in accordance with an exemplary embodiment of the present invention; and FIG. 2 illustrates a system for estimating a position of moving objects in a set of image data in accordance with an exemplary embodiment of the present invention.

DETAILED DESCRIPTION OF THE PREFERRED EMBODIMENTS

FIGS. 1A, 1B and 1C are flowcharts illustrating the steps carried out for estimating a position of moving objects in a set of image data in accordance with an exemplary embodiment of the present invention. In step 102 of FIG. 1A, a position of an object is identified in a first frame of image data acquired at a first time. The frames of image data can be any number of pre-stored frames of image data which can be selected and retrieved from a database of images or from any other electronic storage media. Alternatively, the frames of image data can be any number of frames of image data acquired in any manner known in the art, from any of a variety of electro-optical or imaging systems or sensors including, but not limited to, a thermal sensor, imaging radar sensor, infrared sensor, Charge-Coupled Device (CCD) cameras, Forward-Looking Infrared (FLIR), vidicon cameras, Low Light Level cameras, laser illuminated cameras or the like. However, any system which collects image data can be used to acquire the frames of image data.

To keep a record of positional data of the object, in step 104 a database is maintained of positional values of the object. According to exemplary embodiments, the database can be any type of computer database which stores information in any type of electronic storage media for later retrieval. For example, the database can reside either internally or externally to any tracker system with which the present invention can interface. The positional values of the object can include the positional data from the initial position to the last known position of the object and can include, for example, the velocity or acceleration of the object, or any combination thereof or any additional types of positional information. The positional values of the object can be maintained for every frame of image data.

In step 106, a database is maintained of stabilization values of the object. The stabilization values of the object can be maintained for every frame of image data. The stabilized values can be generated by, for example, an Inertial Measurement Unit (IMU) or any other type of inertial unit. Those of ordinary skill in the art will recognize that the positional values and the stabilization values can be maintained for any number of frames of image data. In addition, those of ordinary skill in the art will recognize that any or all of the maintained positional and stabilization values and any or all of the collected frames of image data can be used by exemplary embodiments of the present invention to estimate the position of moving objects in a set of image data.

Determining the direction of a target while it is occluded is difficult, especially for non-IMU data, because a tracker system does not lock onto the same exact centroid position of the target in each frame of image data. The tracker may lock onto a position that is a few pixels away from the original centroid position. Furthermore, while the calculations performed according to exemplary embodiments of the present invention can use both integer and fractional-integer pixel values to determine the position location of an object in a frame of image data, conventional tracker systems can only handle integer pixel values. Consequently, the positional values generated by exemplary embodiments of the present invention may have to be rounded to the nearest whole integer before being passed to the tracker system. This may result in position errors in the algorithms used by conventional tracker systems. The presence of rounding/position errors in conjunction with the tracker system not precisely locking onto the same position can cause the tracker to have a wobble or other types of distortion in it. The wobble and other similar types of distortion can be further exacerbated if the background of the imagery is moving. Thus, without compensation, it is possible that these errors and distortion may affect the accuracy of the directional estimates generated by exemplary embodiments of the present invention.

To solve the problems associated with wobble and other similar types of distortion, exemplary embodiments of the present invention stabilize the image data for processing. As will be described hereinafter, the outputs of the stabilization process are pixel values that represent how much the background in the imagery is moving. If the background is stationary, for example, then these values are zero. Exemplary embodiments of the present invention use these values to assist in minimizing the effects that the wobble and other similar types of distortion can have in determining the direction of movement of the target while it is occluded.

In step 108, a determination is made as to whether the object is undetected in a second frame of image data acquired at a second time. Since most conventional target tracking systems can issue a loss of lock indicator when a target cannot be tracked, the loss of lock indication can be used to determine whether or not the exemplary steps of the present invention should be performed to track an occluded target. However, any indication that a loss of target has occurred can be used. In step 110, if the track of the object has not been lost by the tracker system (i.e., the object is detected in the second frame of image data), the positional and stabilization values of the object are updated in the databases of positional and stabilization values in steps 104 and 106, respectively. However, in step 110, if it is determined that the track of the object has been lost by the tracker system (i.e., the object is undetected in the second frame of image data), in step 112 the positional values of the object are retrieved from the database of positional values. These values can include, for example, both the past and present positions of the object or any other desired positional values. In step 114, the stabilization values of the object are retrieved from the database of stabilization values.

If it is determined that the track of the object has been lost by the tracker system in step 110 of FIG. 1A, in step 116 of FIG. 1B, the movement of the object can be estimated to determine its estimated position in the second frame of image data using at least one of velocity and acceleration of the object and time between frames of image data. According to exemplary embodiments, in step 118, difference values are calculated between the first frame of image data and the second frame of image data for positional values of the object. The resulting values represent the positional difference between frames. In step 120, difference values are calculated between the first frame of image data and the second frame of image data for stabilization values of the object. In step 122, the stabilization difference values are subtracted from the positional difference values for each frame of image data to generate stabilized positional difference values. The resulting stabilized positional difference values represent the actual true movement of the target regardless of the background.

In step 124, the data time interval is determined using a time between frames of image data. The data time interval can be a time constant that is equal to the number of frames between the initial target lock and the last known target lock. In step 126, an absolute displacement of the object is determined by summing the stabilized positional difference values over the data time interval.

In step 128 of FIG. 1C, a constant acceleration of the object is calculated during the time interval using a predetermined acceleration function. According to exemplary embodiments, the constant acceleration can be calculated using the following equation:

$$a = \frac{(r_i - r_o) - v_o * t}{0.5 * t^2} \quad (1)$$

In the above equation (1), "a" is the constant acceleration, "$r_i$" is the current position of the object in pixel space, "$r_o$" is the initial position of the object in pixel space, "$v_o$" is the initial velocity of the object, and "t" is the data time interval. For example, the initial position of the object can be near the center of the image and the initial velocity can be zero. However, the variables can be any values.

In step 130, the current velocity of the object is calculated during the data time interval using a predetermined velocity function. According to exemplary embodiments, the current velocity can be calculated using the following equation:

$$v_i = v_o + a * t \quad (2)$$

In the above equation (2), "$v_i$" is the current velocity of the object, "$v_o$" is the initial velocity of the object, "a" is the constant acceleration calculated using equation (1), and "t" is the data time interval.

In step 132, the estimated movement of the object is calculated from the constant acceleration and current velocity using a predetermined position function. The estimated movement determines the distance that the object has traveled in the next frame of imagery. According to exemplary embodiments, the estimated movement can be calculated using the following equation:

$$r_e = r_i \pm \frac{1}{2}(v_o + v_i) * t \quad (3)$$

In the above equation (3), "$r_e$" is the estimated movement of the object, "$r_i$" is the initial position of the object, "$v_o$" is the initial velocity of the object, "$v_1$" is the current velocity of the object calculated using equation (2), and "t" is the data time interval.

In step 134, the actual movement of the object is calculated by adding the stabilization difference values to the estimated movement of the object. The estimated movement can be calculated using equation (3). According to exemplary embodiments, the stabilization values from the previous frame of image data are added to the actual movement. Incorporating the stabilized values into the estimated movement allows for a determination of the direction of movement of the object while it is obscured. The direction of movement of the object can be determined from the sign of the actual movement. Thus, if the value is positive, then the object is moving from left to right in the imagery and so will be located to the right of its previous position, where pixels increase from left to right. However, if the value is negative, then the object is moving from right to left in the imagery and so will be located to the left of its previous position.

In step 136, the estimated position of the object in the second frame of image data is calculated by adding the actual movement of the object to the position of the object in the first frame of image data. Thus, the new estimated position of the object can be calculated by adding the estimated distance moved to the last known position of the object. Once this is accomplished, in step 138 the new positional value is passed out to the tracker system for use in evaluating the track function in the next frame of image data.

If the tracker is still unable to lock onto the target, then the process can be repeated. For example, according to exemplary embodiments, the estimated position can be used to determine the position of the object in a third frame of image data acquired at a third time. However, the present invention can be used to determine the position of the object in any number of frames of image data acquired at any number of additional times. Once the object becomes visible again, the tracker system can automatically reestablish the track of the object again, since exemplary embodiments of the present invention allow the tracker system to track the object while it is occluded.

A system for estimating a position of moving objects in a set of image data in accordance with an exemplary embodiment of the present invention will be described with reference to FIG. 2. According to exemplary embodiments, the steps of a computer program as illustrated in FIGS. 1A-1C can be performed using an Occluded Target Tracker (OTT) 200. OTT 200 can be a computer, such as, for example, a personal computer or any other computer system. OTT 200 can include a memory 210. Memory 210 can be any computer memory or any other form of electronic storage media that is located either internally or externally to OTT 200. Memory 210 can store, for example, the steps of a computer program as illustrated in FIGS. 1A-1C. As will be appreciated based on the foregoing description, memory 210 can be programmed using conventional techniques known to those having ordinary skill in the art of computer programming to carry out the steps of a computer program as illustrated in FIGS. 1A-1C described herein. The actual source code or object code for carrying out the steps of a computer program as illustrated in FIGS. 1A-1C can be stored in memory 210.

OTT 200 can be interfaced to any conventional target tracker system 225 using an interface 230. Interface 230 can be any form of electrical interface, such as, for example, an electrical cable providing an RS-232 connection between OTT 200 and target tracker 225. However, those skilled in the art will appreciate that interface 230 is not limited to such an embodiment. For example, interface 230 can include mechanisms ranging from a simple wire connection to a more complex fiber optic connection, with each capable of using different protocols for transferring electrical information. In other words, interface 230 encompasses any means for providing a conduit through which electronic image information and any other electronic signals can be passed between two electronic devices. Alternatively, OTT 200 can be incorporated into any conventional tracker system 225 by, for example, incorporating the source code or object code for OTT 200 into the source code or object code of target tracker system 225.

Memory 210 can store steps of a computer program to identify a position of an object in a first frame of image data acquired at a first time. The frames of image data 220 can be any number of pre-stored frames of image data which can be selected and retrieved from a database of images or from any other electronic storage media. Alternatively, the frames of image data 220 can be any number of frames of image data acquired in any manner known in the art, from any of a variety of electro-optical or imaging systems or sensors including, but not limited to, a thermal sensor, imaging radar sensor, infrared sensor, Charge-Coupled Device (CCD) cameras, Forward-Looking Infrared (FLIR), vidicon cameras, Low Light Level cameras, laser illuminated cameras or the like. However, any system which collects image data can be used to acquire the frames of image data 220. The frames of image data can be accessed by both OTT 200 and target tracker 225.

Memory 210 can store steps of a computer program to maintain a database of positional values of the object. According to exemplary embodiments, the database can be any type of computer database which stores information in any type of electronic storage media for later retrieval. For example, the database can reside either internally or externally to any tracker system with which the present invention can interface. The positional values of the object can include the positional data from the initial position to the last known position of the object. The positional values can include, for example, the velocity or acceleration of the object, or any combination thereof or any additional types of positional information. The positional values of the object can be maintained for every frame of image data. Memory 210 can store steps of a computer program to maintain a database of stabilization values. The stabilization values of the object can be maintained for every frame of image data 220. The stabilized values can be generated by, for example, an IMU or any other type of inertial unit.

Those of ordinary skill in the art will recognize that the positional values and the stabilization values can be maintained for any number of frames of image data. In addition, those of ordinary skill in the art will recognize that any or all of the maintained positional and stabilization values and any or all of the collected frames of image data can be used by exemplary embodiments of the present invention to estimate the position of moving objects in a set of image data.

Memory 210 can also store steps of a computer program to determine that the object is undetected in a second frame of image data acquired at a second time. Since most conventional target tracking systems can issue a loss of lock indicator when a target cannot be tracked, the loss of lock indication can be used to determine whether or not exemplary embodiments of the present invention can be used to track an occluded target. However, any indication that a loss of target has occurred can be used. The loss of lock indicator can be passed to OTT 200 over, for example, interface 230. Memory 210 can store steps of a computer program to retrieve positional values of the object from a database of positional values and to retrieve stabilization values of the object from a database of stabilization values if a determination is made that the object is undetected.

Memory 210 can store steps of a computer program to estimate movement of the object to determine its estimated position in the second frame of image data using at least one of velocity and acceleration of the object and time between frames of image data. Memory 210 can store steps of a computer program to calculate the difference between the first frame of image data and the second frame of image data for positional values of the object and to calculate the difference values between the first frame of image data and the second frame of image data for stabilization values of the object. Memory 210 can also store steps of a computer program to subtract the stabilization difference values from positional difference values for each frame of image data to generate stabilized positional difference values.

Memory 210 can store steps of a computer program to determine a data time interval using a time between frames of image data. The data time interval can be a time constant that is equal to the number of frames between the initial target lock to the last known target lock. Memory 210 can also store steps of a computer program to determine an absolute displacement of the object by summing the stabilized positional difference values over the data time interval.

Memory 210 can store steps of a computer program to calculate a constant acceleration of the object during the data time interval using a predetermined acceleration function. According to exemplary embodiments, the constant acceleration can be calculated using equation (1). Memory 210 can also store steps of a computer program to calculate a current velocity of the object during the data time interval using a predetermined velocity function. According to exemplary embodiments, the current velocity can be calculated using equation (2). Memory 210 can store steps of a computer program to calculate an estimated movement of the object from the constant acceleration and current velocity using a predetermined position function. According to exemplary embodiments, the estimated movement can be calculated using equation (3).

Memory 210 can store steps of a computer program to calculate an actual movement of the object by adding stabilization difference values to the estimated movement of the object. Memory 210 can also store steps of a computer program to calculate an estimated position of the object in the second frame of image data by adding the actual movement of the object to the position of the object in the first frame of image data. Memory 210 can store steps of a computer program to use the estimated position to determine a position of the object in a third frame of image data acquired at a third time, if the tracker is still unable to lock onto the target.

OTT 200 can also include a processor 205 for accessing memory 210 to execute the steps of a computer program as illustrated in FIGS. 1A-1C. Processor 205 can be any known processor, such as, for example, a microprocessor or digital signal processor. The system can also include a display 215 that can be used in conjunction with OTT 200 and target tracker 225, for example, to display to an operator frames of image data and the estimated position of an object in those frames of image data. Display 215 can be a computer monitor or any other video display device for displaying graphical and/or textual information to a user.

The steps of a computer program as illustrated in FIGS. 1A-1C for estimating a position of moving objects in a set of image data can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for estimating a position of moving objects in a set of image data, wherein the objects are occluded in at least a portion of the image data, the method comprising the steps of:

identifying a position of an object in a first frame of image data acquired at a first time based on first positional values of the object and first stabilization values of the object, the stabilization values being associated with movement in background of the image data;

determining that the object is undetected in a second frame of image data acquired at a second time;

associating second positional values of the object and second stabilization values of the object with the second frame of image data;

estimating movement of the object to determine its estimated position in the second frame of image data by compensating for image destabilization and by using at least one of velocity and acceleration of the object and time between frames of image data, wherein the estimating step includes calculating positional difference values of the object using the first and second positional values, calculating stabilization difference values of the object using the first and second stabilization values, subtracting stabilization difference values from positional difference values for each frame of image data to generate stabilized positional difference values;

using the estimated position to determine a position of the object in a third frame of image data acquired at a third time; and calculating an actual movement of the object by adding the stabilization difference values to the estimated movement.

2. The method of claim 1, wherein the step of identifying comprises the step of:

maintaining a database of positional values of the object.

3. The method of claim 1, wherein the step of identifying comprises the step of:

maintaining a database of stabilization values of the object.

4. The method of claim 1, wherein the step of associating comprises the step of:

retrieving second positional values of the object from a database of positional values.

5. The method of claim 1, wherein the step of associating comprises the step of:

retrieving second stabilization values of the object from a database of stabilization values.

6. The method of claim 1, wherein the step of estimating comprises the step of:

determining a data time interval using a time between frames of image data.

7. The method of claim 6, wherein the step of estimating comprises the step of:

determining an absolute displacement of the object by summing the stabilized positional difference values over the data time interval.

8. The method of claim 7, wherein the step of estimating comprises the step of:
calculating a constant acceleration of the object during the data time interval using a predetermined acceleration function.

9. The method of claim 8, wherein the step of estimating comprises the step of:
calculating a current velocity of the object during the data time interval using a predetermined velocity function.

10. The method of claim 9, wherein the step of estimating comprises the step of:
calculating an estimated movement of the object from the constant acceleration and current velocity using a predetermined position function.

11. The method of claim 1, wherein the step of estimating comprises the step of:
calculating an estimated position of the object in the second frame of image data by adding the actual movement of the object to the position of the object in the first frame of image data.

12. A system for estimating a position of moving objects in a set of image data, wherein the objects are occluded in at least a portion of the image data, the system comprising:
a memory that stores steps of a computer program to:
identify a position of an object in a first frame of image data acquired at a first time based on positional values and stabilization values, the stabilization values being associated with movement in a background of the image data,
determine that the object is undetected in a second frame of image data acquired at a second time,
associating second positional values and second stabilization values with the second frame of image data;
estimate movement of the object to determine its estimated position in the second frame of image data by compensating for image destabilization and by using at least one of velocity and acceleration of the object and time between frames of image data, wherein to estimate movement the computer program calculates positional difference values using the first and second positional values, calculates stabilization difference values using the first and second stabilization values, and subtracts stabilization difference values from positional difference values for each frame of image data to generate stabilized positional difference values;
use the estimated position to determine a position of the object in a third frame of image data acquired at a third time,
calculate an actual movement of the object by adding the stabilization difference values to the estimated movement of the object; and
a processor for accessing the memory to execute the steps.

13. The system of claim 12, wherein the memory stores steps of a computer program to:
maintain a database of positional values of the object.

14. The system of claim 12, wherein the memory stores steps of a computer program to:
maintain a database of stabilization values of the object.

15. The system of claim 12, wherein for the associating step the memory stores steps of a computer program to:
retrieve second positional values of the object from a database of positional values.

16. The system of claim 12, wherein for the associating step the memory stores steps of a computer program to:
retrieve second stabilization values of the object from a database of stabilization values.

17. The system of claim 12, wherein the memory stores steps of a computer program to:
determine a data time interval using a time between frames of image data.

18. The system of claim 17, wherein the memory stores steps of a computer program to:
determine an absolute displacement of the object by summing the stabilized positional difference values over the data time interval.

19. The system of claim 18, wherein the memory stores steps of a computer program to:
calculate a constant acceleration of the object during the data time interval using a predetermined acceleration function.

20. The system of claim 19, wherein the memory stores steps of a computer program to:
calculate a current velocity of the object during the data time interval using a predetermined velocity function.

21. The system of claim 20, wherein the memory stores steps of a computer program to:
calculate an estimated movement of the object from the constant acceleration and current velocity using a predetermined position function.

22. The system of claim 16, wherein the memory stores steps of a computer program to:
calculate an estimated position of the object in the second frame of image data by adding the actual movement of the object to the position of the object in the first frame of image data.

23. A computer-readable storage medium containing a computer program that performs the steps of:
identifying a position of an object in a first frame of image data acquired at a first time based on first positional values of the object and first stabilization values of the object, the stabilization values being associated with movement of a background of the image data;
determining that the object is undetected in a second frame of image data acquired at a second time;
associating second positional values of the object and second stabilization values of the object with the second frame of image data
estimating movement of the object to determine its estimated position in the second frame of image data by compensating for image destabilization and by using at least one of velocity and acceleration of the object and time between frames of image data, wherein the estimating step includes calculating positional difference values using first and second positional values, calculating stabilization difference values the object the object using first and second stabilization values, and subtracting stabilization difference values from positional difference values for each frame of image data to generate stabilized positional difference values;
using the estimated position to determine a position of the object in a third frame of image data acquired at a third time; and
calculating an actual movement of the object by adding the stabilization difference values to the estimated movement of the object.

24. The computer-readable storage medium of claim 23, wherein the computer program performs the step of:
maintaining a database of positional values of the object.

25. The computer-readable storage medium of claim 23, wherein the computer program performs the step of:

maintaining a database of stabilization values of the object.

26. The computer-readable storage medium of claim 23, wherein for the associating step the computer program performs the step of:
retrieving second positional values of the object from a database of positional values.

27. The computer-readable storage medium of claim 23, wherein for the associating step the computer program performs the step of:
retrieving second stabilization values of the object from a database of stabilization values.

28. The computer-readable storage medium of claim 23, wherein the computer program performs the step of:
determining a data time interval using a time between frames of image data.

29. The computer-readable storage medium of claim 28, wherein the computer program performs the step of:
determining an absolute displacement of the object by summing the stabilized positional difference values over the data time interval.

30. The computer-readable storage medium of claim 29, wherein the computer program performs the step of:
calculating a constant acceleration of the object during the data time interval using a predetermined acceleration function.

31. The computer-readable storage medium of claim 30, wherein the computer program performs the step of:
calculating a current velocity of the object during the data time interval using a predetermined velocity function.

32. The computer-readable storage medium of claim 31, wherein the computer program performs the step of:
calculating an estimated movement of the object from the constant acceleration and current velocity using a predetermined position function.

33. The computer-readable storage medium of claim 23, wherein the computer program performs the step of:
calculating an estimated position of the object in the second frame of image data by adding the actual movement of the object to the position of the object in the first frame of image data.

* * * * *